US006243700B1

(12) United States Patent
Zellweger

(10) Patent No.: US 6,243,700 B1
(45) Date of Patent: Jun. 5, 2001

(54) METHOD AND APPARATUS FOR GENERATING A HYPERTEXT-BASED CONTENT MENU USING AN OPEN HIERARCHICAL DATA STRUCTURE

(75) Inventor: Paul Zellweger, 12 Holworthy Pl., Cambridge, MA (US) 02138

(73) Assignee: Paul Zellweger, Cambridge, MA (US)

( * ) Notice: Subject to any disclaimer, the term of this patent is extended or adjusted under 35 U.S.C. 154(b) by 0 days.

(21) Appl. No.: 09/080,100

(22) Filed: May 16, 1998

Related U.S. Application Data

(60) Provisional application No. 60/046,920, filed on May 16, 1997.

(51) Int. Cl.[7] ................................................. G06F 17/30
(52) U.S. Cl. ................................. 707/3; 707/4; 707/102; 707/104
(58) Field of Search ............................... 707/4, 103, 203, 707/102

(56) References Cited

U.S. PATENT DOCUMENTS

| 5,530,852 | | 6/1996 | Meske et al. ........................ 707/501 |
| 5,603,025 | | 2/1997 | Tabb and Hermann .................. 707/2 |
| 5,630,125 | * | 5/1997 | Zellweger ............................. 707/103 |
| 5,712,979 | | 1/1998 | Garber et al. ......................... 707/501 |
| 5,717,860 | | 2/1998 | Garber et al. .......................... 705/14 |
| 5,920,696 | * | 7/1999 | Brandt et al. .................... 395/200.48 |
| 5,923,885 | * | 7/1999 | Johnson et al. ...................... 395/712 |
| 5,959,630 | * | 9/1999 | Takeuchi et al. .................... 345/348 |
| 5,987,454 | * | 11/1999 | Hobbs ..................................... 707/4 |
| 6,006,252 | * | 12/1999 | Wolfe ................................... 709/203 |
| 6,131,098 | * | 10/2000 | Zellweger ............................. 707/102 |
| 6,131,100 | * | 10/2000 | Zellweger ............................. 707/104 |
| 6,144,968 | * | 11/2000 | Zellweger ............................. 707/104 |

* cited by examiner

*Primary Examiner*—Thomas Black
*Assistant Examiner*—Charles L. Rones

(57) ABSTRACT

A menu authoring system is disclosed that uses an open hierarchical data structure to generate source code for hypertext list menus that constitute a content menu on a Web site. The authoring system allows developers to select how and when these menu files are generated and the optimum output file size. The authoring system can generate menu files at runtime or prior to a general release; it can also generate one or more list menus to the same hypertext file. This enables the Web developer to generate menu files that can be optimized for use in a client-server network, or used to track end-user navigation.

20 Claims, 15 Drawing Sheets

| NODE | TOPIC | TAG | PARENT | CHILD | SIBLING | MEM | LEVEL | KIDS | FILE |
|---|---|---|---|---|---|---|---|---|---|
| 30 | [ root node ] | 0 | NULL | 31 | NULL | 26 | 0 | 4 | 0 |
| 31 | Author | 1 | 30 | 35 | 32 | 48 | 1 | 4 | 0 |
| 32 | Language | 2 | 30 | 39 | 33 | 13 | 1 | 2 | 0 |
| 33 | Subject | 3 | 30 | 41 | 34 | 75 | 1 | 4 | 0 |
| 34 | Title | 4 | 30 | 45 | NULL | 103 | 1 | 4 | 0 |
| 35 | Liscombe, R.N. | 100 | 31 | B | 36 | 0 | 2 | 0 | 0 |
| 36 | Meyer, Peter | 101 | 31 | D | 37 | 0 | 2 | 0 | 0 |
| 37 | Turner, W.J. | 102 | 31 | A | 38 | 0 | 2 | 0 | 0 |
| 38 | West, T.W. | 103 | 31 | C | NULL | 0 | 2 | 0 | 0 |
| 39 | English | 50 | 32 | 49 | 40 | 17 | 2 | 1 | 0 |
| 40 | German | 51 | 32 | 52 | NULL | 86 | 2 | 3 | 0 |
| ... | | | | | | | | | |
| 52 | Schweizer Wohnhauser | 1004 | 40 | D | NULL | 0 | 3 | 0 | 0 |

HTML Configuration Window

Developer:
Company:
Contactst::
Copyright:
Home Page:
Menu Frame:
Object Frame:

File Generation:  ○ On Demand Runtime HTML file
                  ○ Compiled HTML Server files File Use:  ○ Multiple List File,
             Opimal File Size: ☐ k
           ○ Track End-User Naviagtion (Done)  (Cancel)

Fig. 7

74
```
<!-- Generated by ArborWay, Inc. -->
<!-- Cambridge, MA 02138 (617) 864-1040 --!>
<!-- File: F0.HTM  Created: May-13-1997 12:03 --!>
<!-- Author: Anna Zellweger --!>
<!-- Copyright 1998 by ArborWay Inc.

<HTML><HEAD>
<TITLE>Content Menu</TITLE>
</HEAD>
<BODY>
```

75
```
<NAME=F0></A>
<CENTER><B><FONT SIZE=+1>Content Menu</B></FONT><FONT SIZE=-1><BR>
<A HREF="F0.HTM" TARGET=MENUWIN>[C]</A>
<A HREF="F0.HTM" TARGET=MENUWIN>[Previous Menu]</A>
<A HREF="INDEX.HTM" TARGET="_top">[H]</A></CENTER><BR></FONT><UL>
<LI><A HREF="#F31" TARGET=MENUWIN>Author</A><BR>
<LI><A HREF="#F32" TARGET=MENUWIN>Language</A><BR>
<LI><A HREF="#F33" TARGET=MENUWIN>Subject</A><BR>
<LI><A HREF="#F34" TARGET=MENUWIN>Title</A><BR>
</UL>
```

75
```
<NAME=F31></A>
<CENTER><B><FONT SIZE=+1>Author</B></FONT><FONT SIZE=-1><BR>
<A HREF="F0.HTM" TARGET=MENUWIN>[C]</A>
<A HREF="F0.HTM" TARGET=MENUWIN>[Previous Menu]</A>
<A HREF="INDEX.HTM" TARGET="_top">[H]</A></CENTER><BR></FONT><UL>
<LI><A HREF="B.HTM" TARGET=OBJWIN>Liscombe, R.N.</A><BR>
<LI><A HREF="D.HTM" TARGET=OBJWIN>Meyer, Peter</A><BR>
<LI><A HREF="A.HTM" TARGET=OBJWIN>Turner, W.J.</A><BR>
<LI><A HREF="C.HTM" TARGET=OBJWIN>West, T.W.</A><BR>
</UL>
```

75
```
<NAME=F32></A>
<CENTER><B><FONT SIZE=+1>Language</B></FONT><FONT SIZE=-1><BR>
<A HREF="F0.HTM" TARGET=MENUWIN>[C]</A>
<A HREF="F0.HTM" TARGET=MENUWIN>[Previous Menu]</A>
<A HREF="INDEX.HTM" TARGET="_top">[H]</A></CENTER><BR></FONT><UL>
<LI><A HREF="#F39" TARGET=OBJWIN>English</A><BR>
<LI><A HREF="#F40" TARGET=OBJWIN>Germain</A><BR>
</UL>
```

76
.
.
.

```
</BODY>
</HTML>
```

77 — `<NAME=F0></A>`
78 — `<CENTER><B><FONT SIZE=+1>Content Menu</B></FONT><FONT SIZE=-1><BR>`
79 — `<A HREF="F0.HTM" TARGET=MENUWIN>[C]</A>`
`<A HREF="F0.HTM" TARGET=MENUWIN>[Previous Menu]</A>`
`<A HREF="INDEX.HTM" TARGET="_top">[H]</A></CENTER><BR></FONT><UL>`
80 — `<LI><A HREF="#F31" TARGET=MENUWIN>Author</A><BR>`
80 — `<LI><A HREF="#F32" TARGET=MENUWIN>Language</A><BR>`
80 — `<LI><A HREF="#F33" TARGET=MENUWIN>Subject</A><BR>`
81   80 — `<LI><A HREF="#F34" TARGET=MENUWIN>Title</A><BR>`
— `</UL>`

`<LI><A HREF="#F31" TARGET=MENUWIN>Author</A><BR>`
        81                  82              81              62  81

Fig. 8c

METHOD AND APPARATUS FOR GENERATING A HYPERTEXT-BASED CONTENT MENU USING AN OPEN HIERARCHICAL DATA STRUCTURE

CROSS REFERENCES TO RELATED APPLICATION

This application is based on Provisional Application No. 60/046,920 entitled "Method and Apparatus for Generating Nested HTML Link Menu Files Using An Open Hierarchical Data Structure", filed May 16, 1997.

FIELD OF INVENTION

The present invention relates to computer software used to organize informatin on a Web site, and in particular, it relates to an end-user access method, identified as a content menu, that is generated by an authoring system that produces linked hypertext list menu files by merging hypertext program code like HTML with menu data managed by an open hierarchical data structure.

BACKGROUND

The conventional use of hypertext links in Web site design makes information-rich sites unnecessarily deep. This forces end-users to navigate in a trial and error fashion to locate relevant information. More direct access methods, such as a table of contents or a search engine, exist but these prior art methods present their own set of limitations. Tables of contents can only provide very broad overviews of sites because they cannot handle the detail, and search engines have a "black box" approach that hides content from end-users and requires them to know what they should ask for.

On a corporate Intranet network with content on multiple servers, the scope and supply detailed information is significantly greater and makes end-user access on this type of Web site even more challenging. End-user services, like a directory assistance, site map, or site index, attempt to scale themselves to the level of detail but, once again, limitations with the underlying technology limit their effectiveness.

For instance, these access services are either built and maintained by hand, or they are based on hierarchical structures that have mutually exclusive paths. While these structures are well suited to handle details, they are inadequate because they cannot cross reference. At the same time, the more flexible hand-coded access methods that easily represent cross links run into major problems when the links and references get too numerous or complex.

Tabb et. al. (Feb. 11, 1997 U.S. Pat. No. 5,603,025) disclose the means to produce cross-indexed hypertext documents that enable end-users to drill-down to investigate details. Meske et. al. (Jun. 25, 1996) also disclose the means to generate links that cross reference a set of information files. Both of these disclosures use HTML links to produce and maintain a set of linked files that enable end-users to access detailed information. However, since both of these methods depend solely upon their own document file structures they cannot be used in a more general way as end-user access tools.

Zellweger (May 13, 1997 U.S. Pat. No. 5,630,125) discloses the means to employ an open hierarchical data structure to organize and manage detailed information about a collection of information. When used with the disclosed authoring system, the structure generates a content menu that supports an extensive set of cross references. Advances brought about by the interactive authoring make it fairly easy to build and maintain the complete network of menu paths, and end-users find it easy to navigate its nested list menus and find what they need.

The Zellweger disclosure addresses both stand-alone and client-server environments but is does not disclose how to generate menu files for a content menu that can overcome performance issues related to client-server networks like the World Wide Web. The authoring system in the prior art generated a single menu file that contained all the nested lists in a content menu. In a stand-alone desktop setting, the invention optimizes response time by fetching data for each list menu from its own storage device. Yet, in a client-server setting, the overhead associated with requesting and transmitting data for each menu list from a remote source on a network, makes this list-by-list retrieval method extremely inefficient, particularly when the succession involves a series of short list menus.

The present disclosure shows how to overcome this problem by generating a series of hypertext menu files that consolidate a series of short, nested list menus into a single file that downloads to the client computer. As the end-user navigates down a content menu the present disclosure also shows how to link one of these menu files to another and how to regulate the overall size of these files. These teachings enable menu developers to benchmark different sets of menu files in order to identify an optimal download file size.

When a content menu has been optimized for a client-server network, as disclosed by this invention, there are a number of unintended benefits. First, the content menu provides an alternative way to access Web pages that has a direct impact on Web sit design. Until now developers had to use "link pages" to furnish page access that produces artificially deep Web site layouts. Second, the menu organizes details on a group of closely related information so end-users can easily compare one unit to another using a single list menu. This allows end-users to pinpoint target information on a Web site, and thereby avoid unnecessary trial and error navigation. Third, information providers get much more information about an end-user's navigating path compared to Web page tracking methods disclosed by Graber et. al. (Jan. 27, 1998, U.S. Pat. No. 5,712,979) and Graber et. al. (May 10, 1998 U.S. Pat. No. 5,517,860) because the provider has overall control of the entire menu path.

OBJECTS AND ADVANTAGES

It is a general object of the present invention to provide a method and apparatus for an authoring system means that can be used to generate and maintain hypertext files that can serve as a content menu on a Web site.

One object of the present invention is to provide the software means for building and maintaining a series of nested link menus derived from an open hierarchical data structure implemented in a hypertext language, like HTML, that is recognized by browser software on a client computer.

Another object of the present invention is to enable Web site developers to select how and when hypertext files are generated so they can configure a content menu application that performs well on a client server network.

One object of the present invention is to provide the means to specify the size of an output hypertext file so the authoring system can generate one or more nested lists to the same file, instead of using the prior method of one list per file, and thereby reduce overall network traffic.

Another object of the present invention is to enable Web site developers to select when hypertext files are generated so they can configure a content menu application that uses dynamic menu data.

One object of the present invention is to provide the means to enable end-users to navigate through a succession of hypertext list menus to locate detailed information and thereby avoid unnecessary trial and error navigation on a Web site.

Another object of the present invention is to provide the software means to enable information providers to track end-user navigation of a content menu.

SUMMARY OF THE INVENTION

The objects of the present invention are attained by providing the methods and apparatus of a menu authoring system that generates nested list menus in tow or more hypertext files that serve as a content menu on a Web site. The authoring system merges menu data stored in an open hierarchical data structure with elements of a hypertext language to produce hypertext files that contain one or more nested list menus per file. Web site developers use the authoring system to create menu paths to individual pages, and end-users navigate these paths to locate relevant information. The authoring system in the present invention supports special settings associated with the output hypertext files that enable the menu developer to specify how and when these files are generated to improve sever response, reduce network traffic, or track end-user navigation.

BRIEF DESCRIPTION OF THE FIGURES

FIG. 5 depicts a database structure used to represent nodes in the open hierarchical data structure.

FIG. 7 depicts the user interface of the authoring system used to configure the output hypertext files that contain the list menus.

FIGS. 8a through 8c depict the components of a hypertext file and the list menus generated by the present invention.

DETAILED DESCRIPTION

Figure 1:
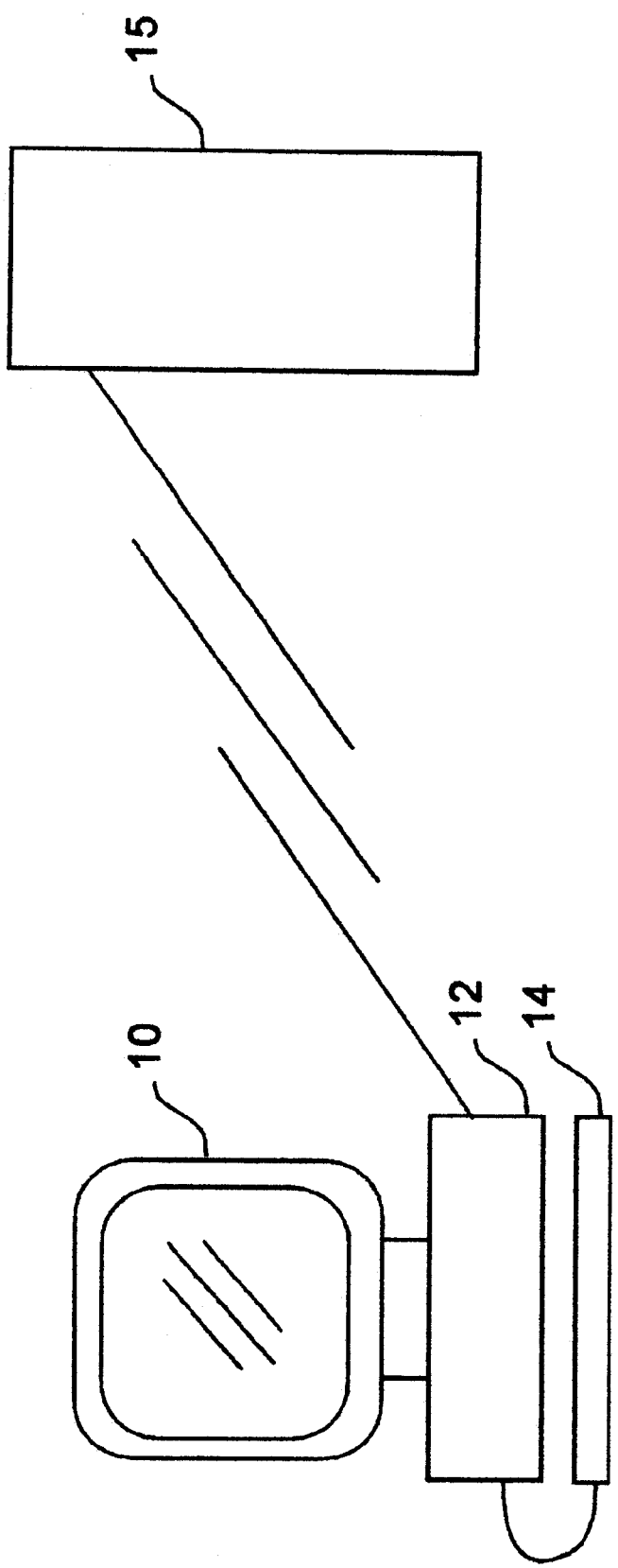
FIG. 1 depicts the client server apparatus of the network in the present invention.

The client server apparatus of the present invention is depicted in FIG. 1. The server computer 15 contains an operating system, a database management system, and communications software, as well as the hypertext files generated by the present invention. The client computer 12 has its own operating system and communication software and is linked electronically to the server computer 15. The client computer 12 includes end-user input devices like keyboard 14 and output devices like a display monitor 10. Browser software, like Netscape, is installed on the client computer 12 and requests hypertext files stored on server computer 15 to generate a user interface on the display monitor 10. The server computer 15 downloads the file over the network to fulfill this request.

Figure 2:
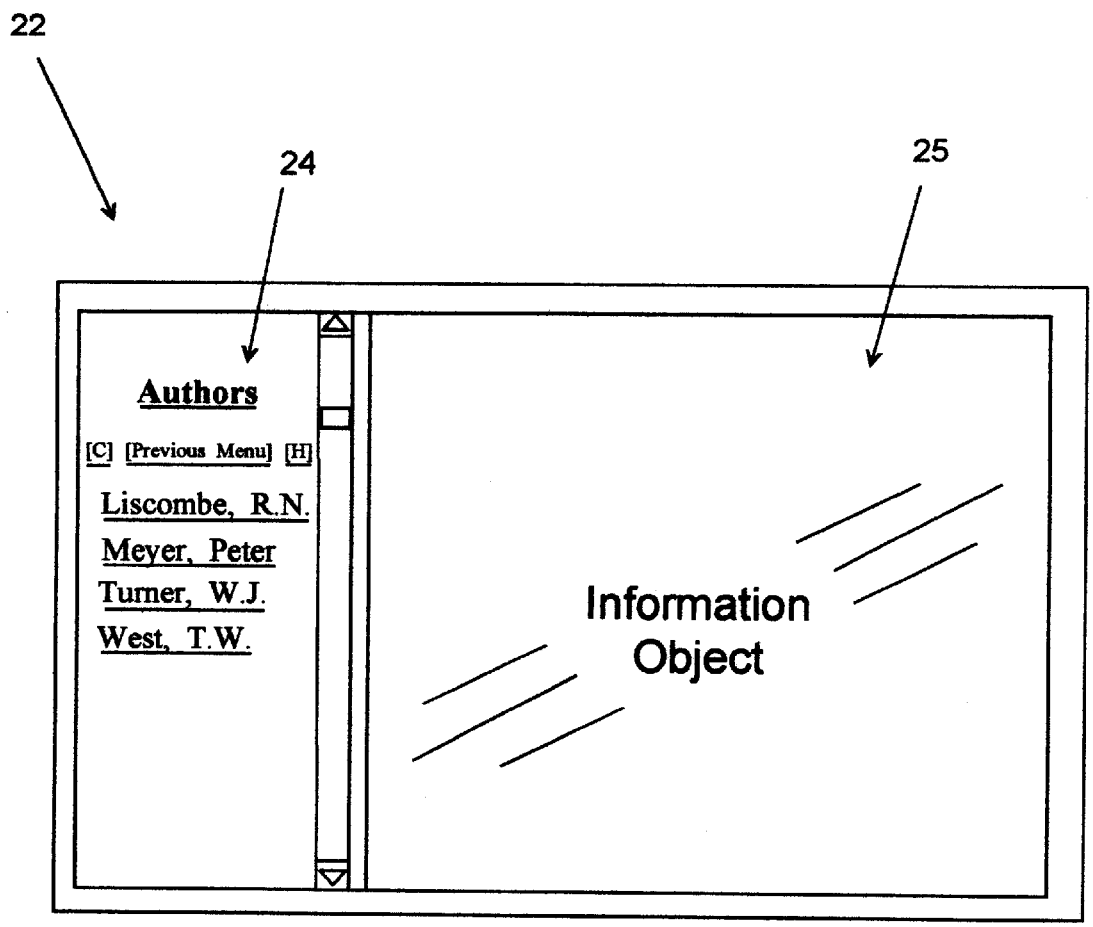
FIG. 2 depicts the user interface of the content menu in the present invention.

FIG. 2 depicts the user interface 22 on the monitor apparatus 10 of the client computer 12. In the preferred embodiment of the present invention the user interface 22 includes a list frame 24 and an object frame 25. The list frame 24 displays the HTML list menus that constitute the content menu generated by the present invention. Each list menu includes one or more list items that link to another HTML list menu or to an information object. End-users navigate these nested list menus to reach information on a Web page that is displayed in the object frame 25. Alternative embodiments of the present invention use one or more frames to display content list menus and information objects.

Each list menu includes a title and navigation commands. The list title corresponds to the list item selected in the last list menu. The navigation commands, found directly under the title, and at the end of a long scrolling list, include links to the Web site home page, top of the content menu, and a prior list. Depending on when the hypertext files were generated, the prior list either links to the last menu visited in a runtime file, or to a primary parent list in a compiled file.

Figure 3:
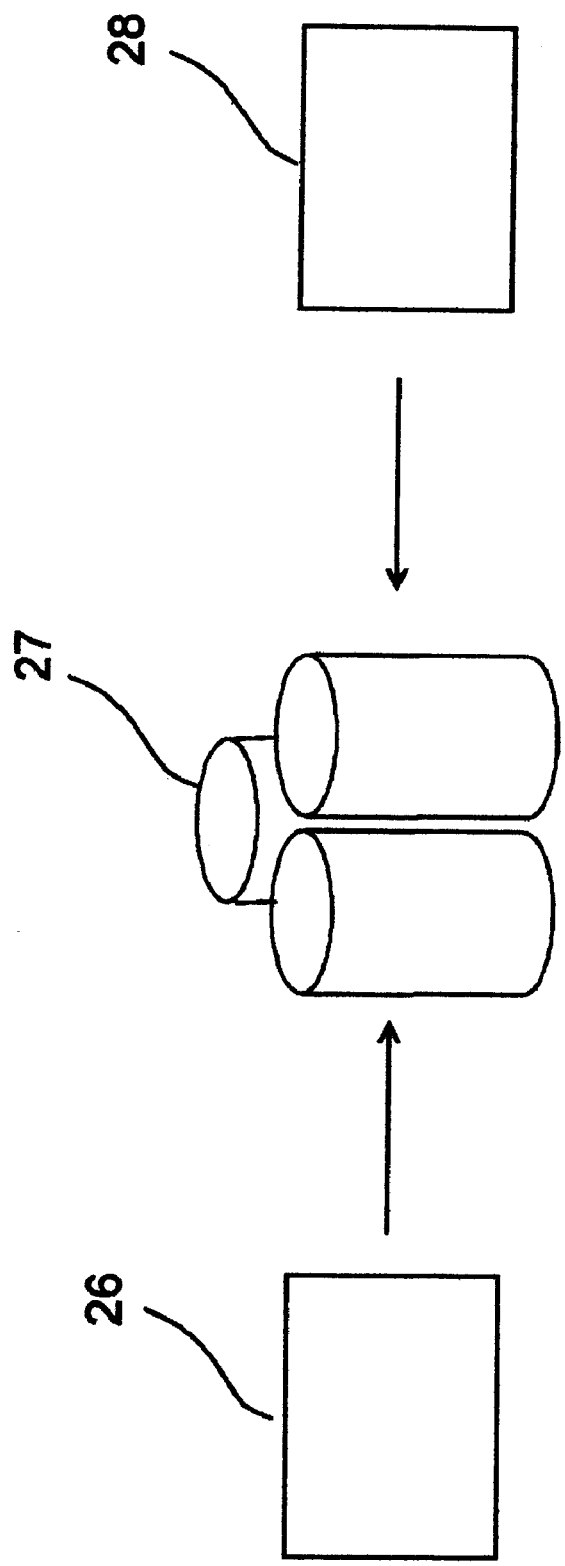
FIG. 3 depicts the relationship of the authoring system, the hypertext files it generates, and the browser software that reads these files.

FIG. 3 depicts the three major components of the present invention. These include the authoring system 26, the hypertext files 27 that the authoring system 26 produces, and a commercially available browser 28. The authoring system 26 includes the interactive software tools and utilities used to build and maintain menu data in an open hierarchical data structure. The authoring system 26, in the present invention, allows a menu developer to select when a hypertext file 27 is generated, at runtime when the client browser software requests it, or as part of a general distribution release.

Figure 4:
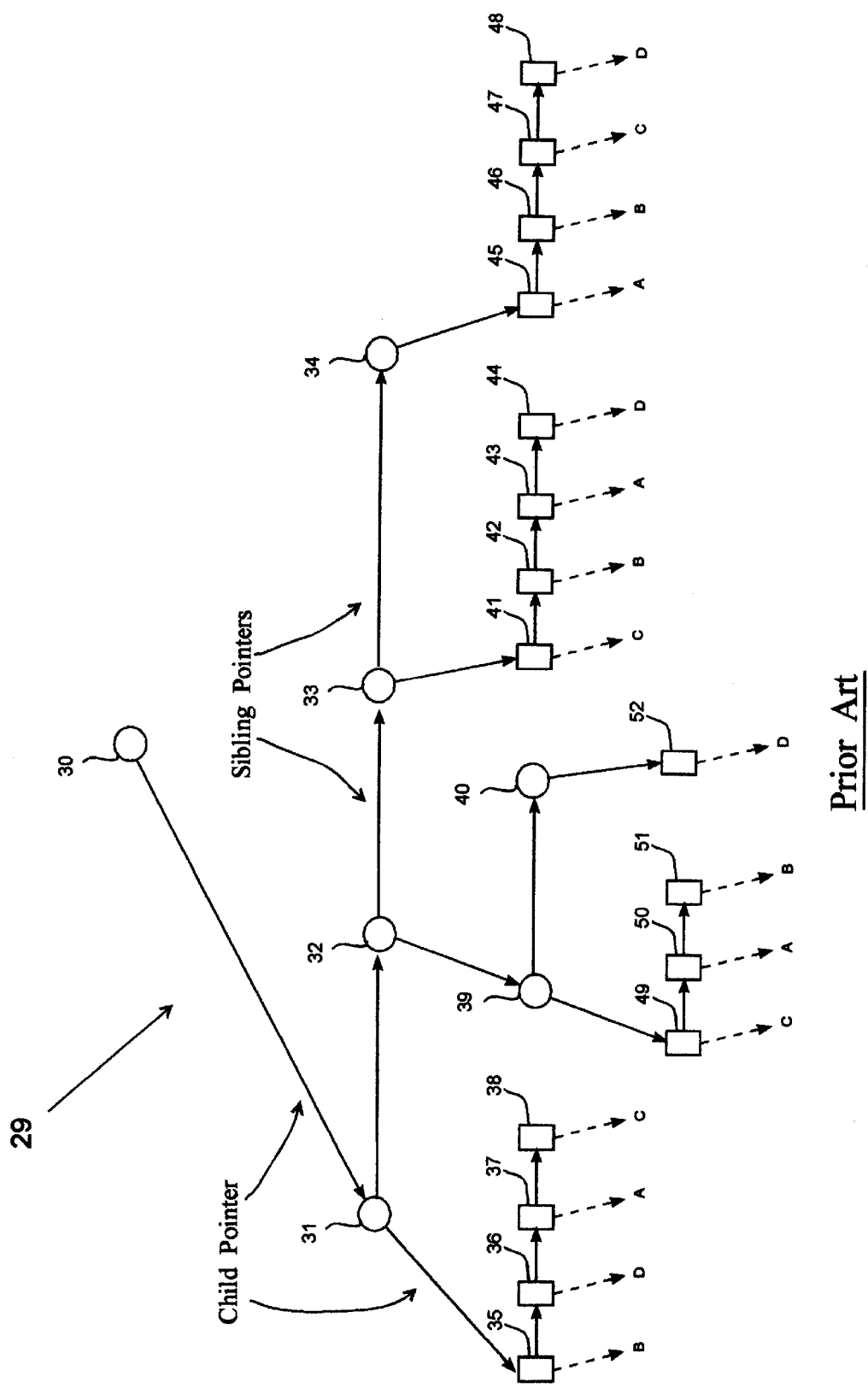
FIG. 4 (prior art) depicts the open hierarchical data structure employed by the authoring system to store and retrieve menu data used for the content menu.

In a general distribution release, the authoring system 26 generates or compiles one or more hypertext files that represent all the lists in a structure 29 in FIG. 4. The complete set of compiled files are stored on the server computer 15 and represent static menu values that do not change over time, that is from one release to the next. The alternative file output, a runtime HTML file, represents dynamic menu values that change whenever changes are made to the open hierarchical structure or its data.

The present invention uses an open hierarchical data structure, a prior art, to manage the network of hypertext links that constitute a content menu. This structure, depicted in FIG. 4 as 29, enables one or more paths to the same Web page object, and thereby represents multiple ways of looking up the same piece of information.

Generational terms, such as parent and child, are used to describe how structural elements relate to one another. For example, the flow in this structure goes from the root node 30 to a leaf node, lets say 52, so a parent node represents a predecessor, and a child node represents a successor. In structure 29, a parent node can only have one child but a child can have more than one parent. Each node in structure 29 corresponds to an item in a list menu. Arcs or pointers show how each item relates to another. Sibling pointers connect a item to a list, and child pointers link an item in one list to another or to a Web page at the end of a path.

The preferred embodiment of the present invention represents nodes in structure 29 in a database structure 60 depicted in FIG. 5. Each row element in structure 60 represents node information associated with a node in the open hierarchical data structure 29. This includes a unique id number in column field 61, a topic representing a list item in 62, a code in 63 used to analyze a selection made in an end-user's navigation path, and the number of child nodes in the next list in 69. Mem 67 stores the amount of file memory required for the current node's successor list. Each list is ordered by the sibling 66, and child 65 stores the node id of the first item in a successor list. Parent 64 stores the node id of the primary parent of the current list; all other parent nodes are considered step parents.

Figure 6:
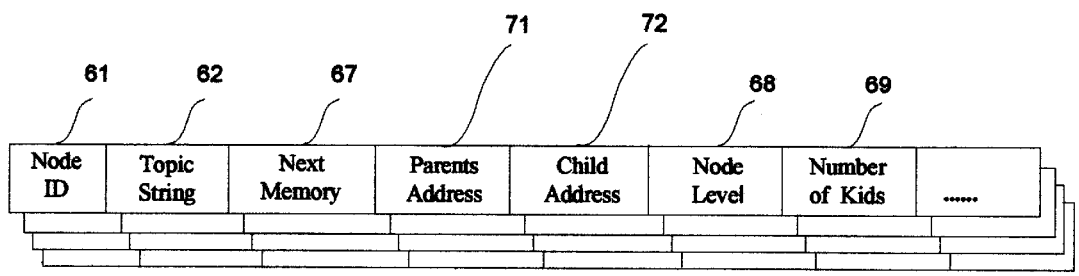
FIG. 6 depicts the record structure of an alternative storage format for nodes in an open hierarchical data structure.

An alternative embodiment of the present invention stores node information in a second in a predetermined file format. Node records are ordered by lists and their respective generations. FIG. 6 depicts the record structure for this file format. Some fields, like node 61, topic 62, sibling 66, mem 67, level 68, and kids 69, directly correspond to database structure 60. In addition, the record structure also includes address information fields on the file location of the parent list in 71 and the successor list in 72. These fields enable the alternative file format to serve as a more efficient retrieval method on a server, compared to a database management system that requires significantly more i/o overhead to locate target data records.

The HTML Configuration Window 73 in the authoring system 26, depicted in FIG. 7, enables content menu developers to configure output hypertext files 27. This includes text fields that enable developers to include header information such as the developer's name, company, phone number, and copyright information, and so on. It also includes text fields to collect information on the Web site's home page URL, and how to configure the default menu and object frames.

Next, developers use radio buttons to indicate when the hypertext files 27 are generated, at runtime or compiled prior to distribution, and how they will be used, for multiple lists or for tracking end-user navigation. When the multiple list option is selected, the developer can also specify an optimal hypertext file size generated by the authoring system 26. This setting enables the system to output one or more smaller nested menu lists to the same file and thereby reduce network traffic on the server and improve response time on client computer 12.

FIGS. 8a through 8c show the components of the HTML hypertext file 27 generated by the authoring system 26. FIG. 8a depicts the major source code components of a hypertext HTML file 27. This includes file header block 74 and file trailer HTML tags 76, and one or more list menus 75. Detailed information supplied by the developer in the HTML configuration window 73 is used to produce comment lines in the file header and produce navigation links used in the list menu.

In the present invention, each hypertext file contains one or more list menus 75. FIG. 8b depicts the significant parts of the list menu 75. Each list menu 75 includes an anchor line 77 for the list menu, a list title line 78, and navigation links 79 to the top of the content menu, to the home page, and to a prior list menu. Next comes one or more list item lines 80. This is all followed by line 81 that includes hypertext tags that mark the end of a list block.

Each list item 80, illustrated in FIG. 8c, consists of fixed length segments 80 of hypertext and variable length segments. The link field 82 and the item string 62 represent variable length fields. The authoring system 26 uses the node 61 to generate and manage links that connect to anchors in the current file and to other URLs.

Figure 9A:
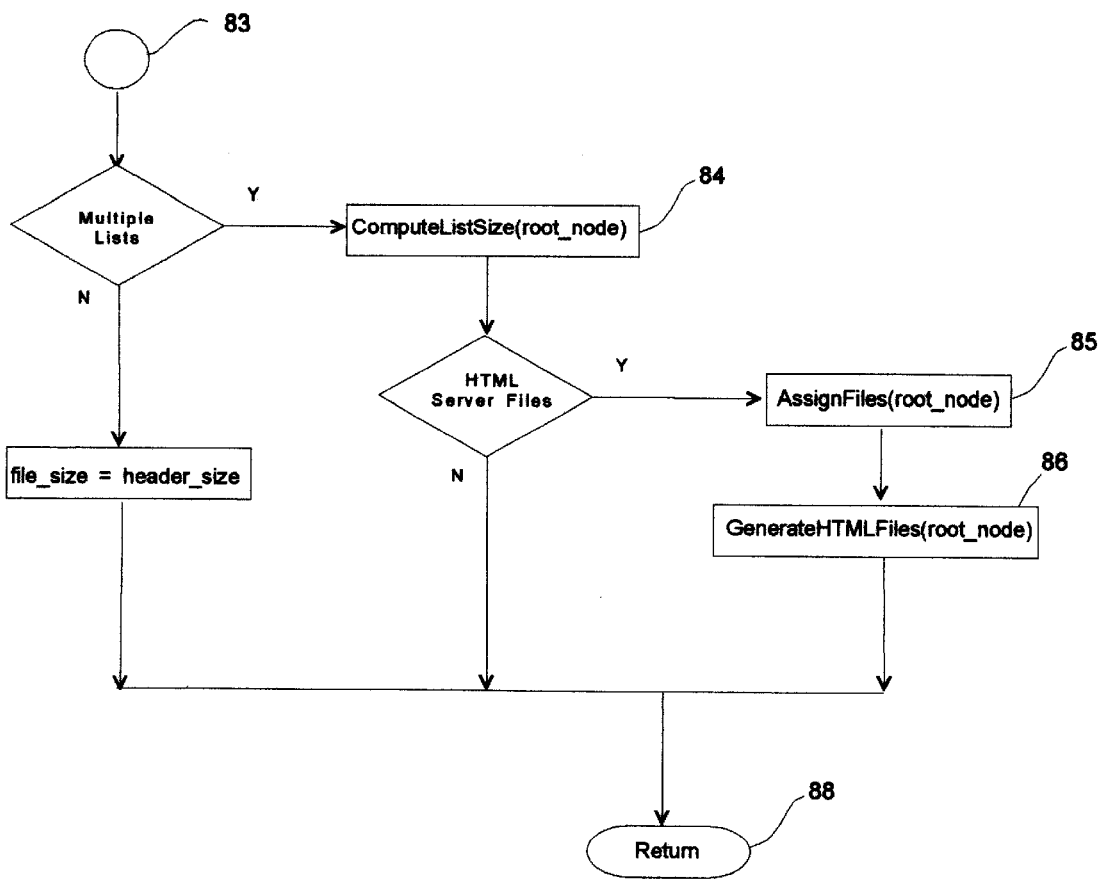
FIGS. 9a through 9d depict the flow charts of an embodiment of the program logic of software in the present invention used to generate compiled hypertext files that are stored on a server computer.

FIGS. 9a through 9d depict flow charts of the software means of the present invention used to set menu generation variables, and output complied hypertext files 27. FIG. 9a depicts the main program driver entered at 83. First, the routine checks if the multiple lists radio button was selected by the developer. If it was not selected the routine sets file_size to the computed header_size, and returns control at 88 to the next event. Otherwise, the authoring system 26 computes the amount of memory required for each list by calling ComputeListSize 90 at 84. Next, it calls AssignFiles 100 at 85 to assign file locations to each node in structure 29. And finally, if the developer selected Compiled HTML Server Files routine 83 calls GenerateHTMLFiles at 86 and returns event control at 88.

Figure 9B:
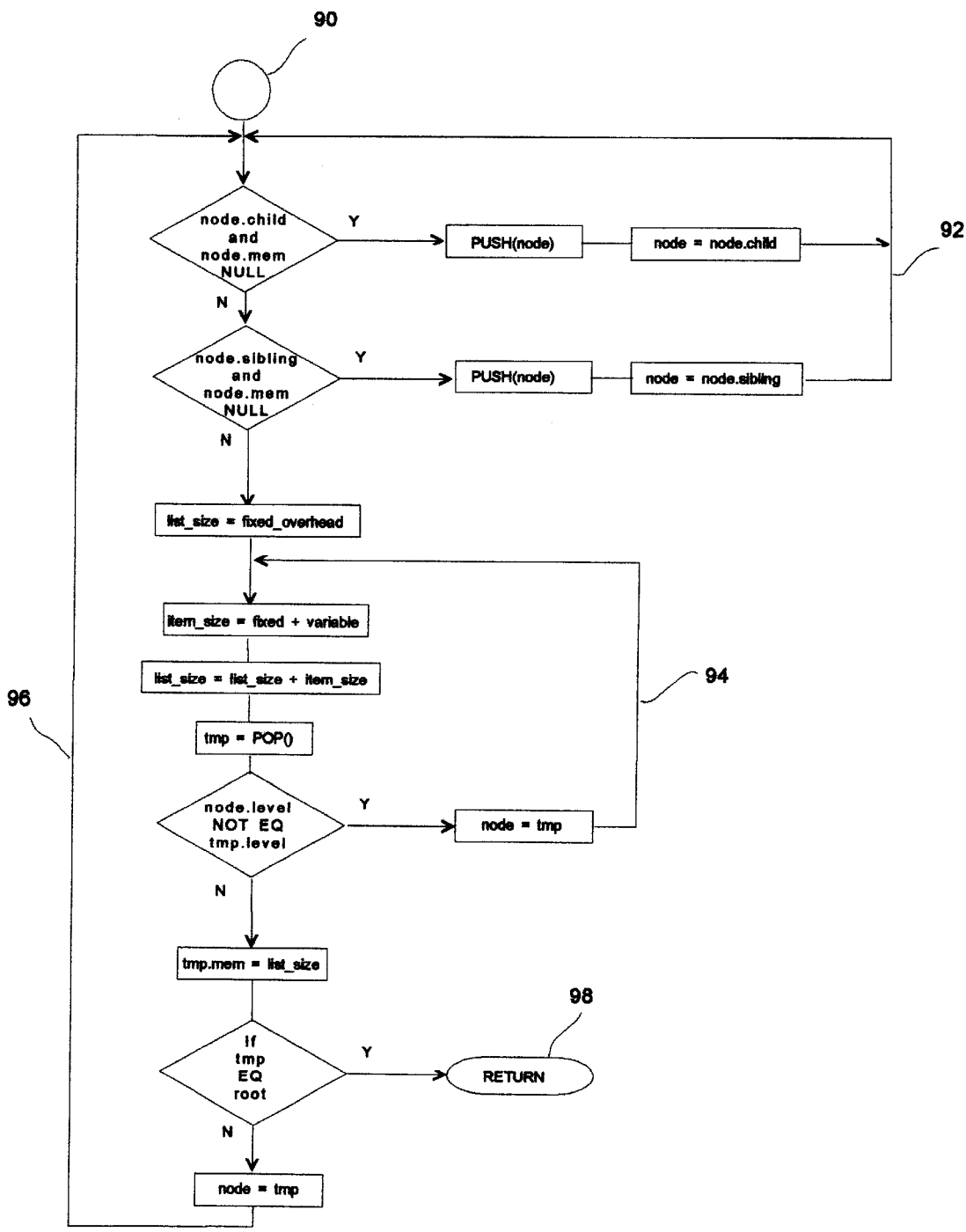
Figure 9C:
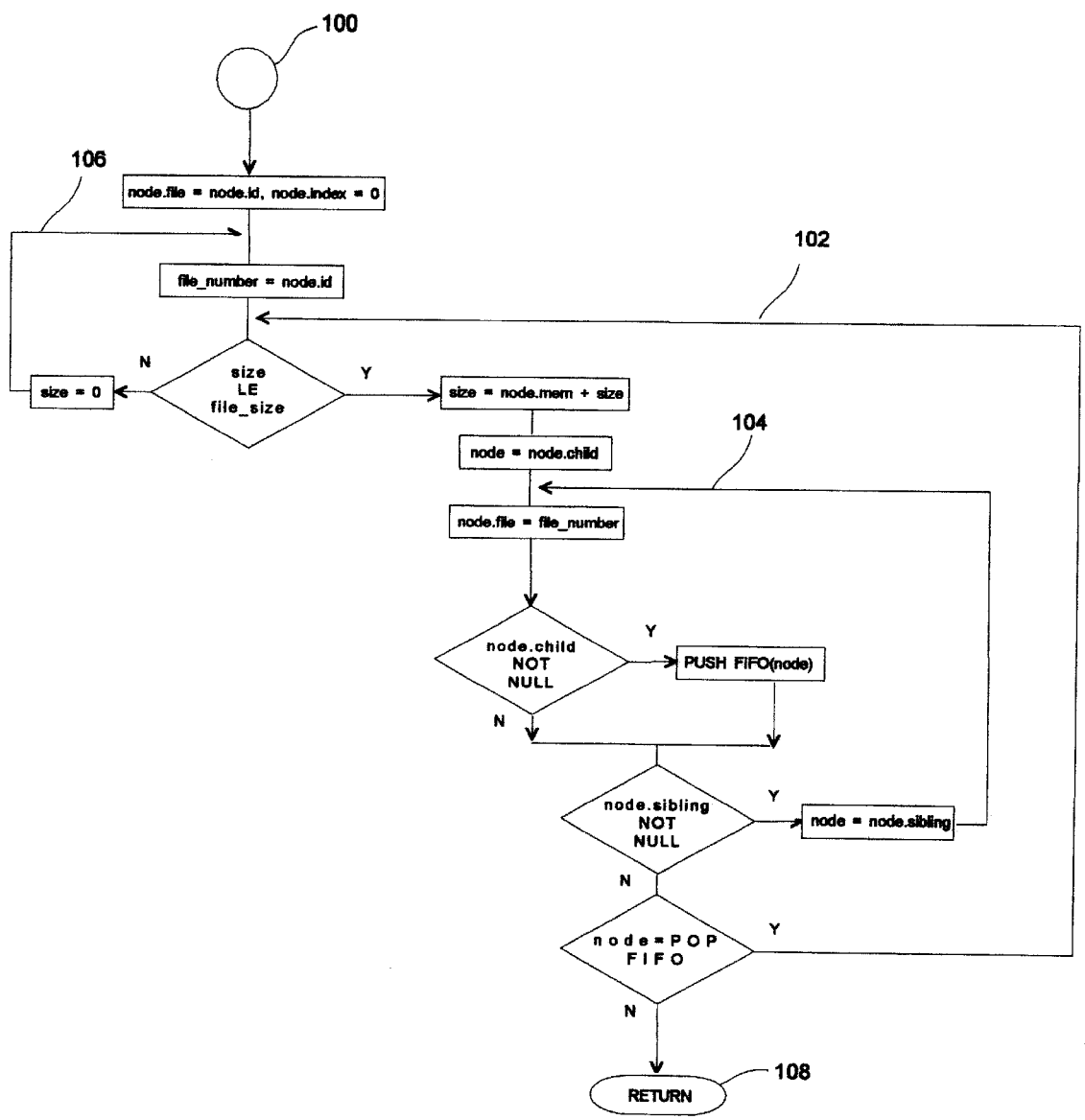

The ComputeListSize routine 90 depicted in FIG. 9b. Routine 90 uses a FILO (First In, Last Out) stack to visit each node in structure 29 to compute memory requirements for each list. In loop 92, routine 90 progresses down the structure and pushes each node on the stack. When the end of a path is reached, routine 90 initializes list_size and iterates through each list item by popping nodes off the FIFO (First In, First Out) stack in loop 94. When a parent node is reached, routine 90 sets its mem 67 to list_size. If the parent node is a root node then program control returns to the calling routine at 98, otherwise it flows to loop 96 to set more node mem 67 values.

Next, the main routine 83 calls routine 100 to assign a file number to each node in the structure. Routine 100, depicted in FIG. 9c, uses a FIFO queue to visit each node in structure 29. If he children's list menu memory requirements are less than te optimum file_size set by the developer in window 73, routine 100 drops into loop 104 to push each child node on the FIFO queue and set file field 70. When the last sibling node is reached the routine pops the first node off the FIFO queue. If the queue returns a node, loop 102 is activated and the new node size is checked. When the cumulative memory size is greater than file_size then control flows through loop 106 where size is set to zero and file_number is set to the current node 61. Once again, control flows through loop 104 until the queue is empty.

Figure 9D:
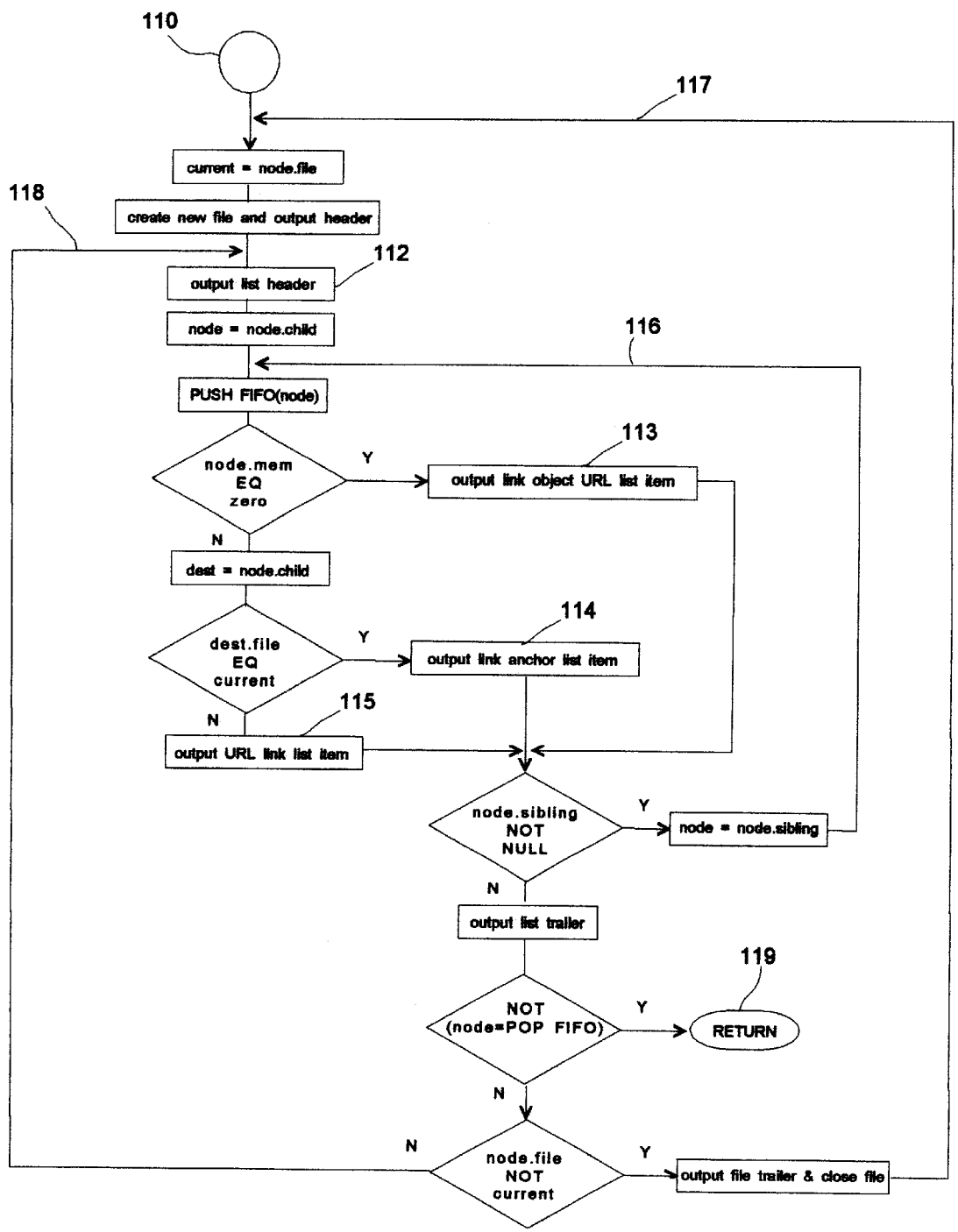

At 86, in the main program driver, the authoring system 26 calls routine 110, depicted in FIG. 9d, to generate the compiled hypertext files 27 stored on the server computer 15. First, routine 110 sets current (file) variable, creates a new file, outputs source code 74 corresponding to the HTML file header. Next, starting at 112 and with loop 116 routine 110 outputs hypertext source code for each list menu associated with the current file variable. Routine 110 uses a FIFO queue to progress down each successive generation of lists. When a node's file 70 differs from current, routine 110 generates source code 76 that corresponds to trailer code, closes the open file, and creates a new file and opens it via loop 117. Otherwise, loop 118 is taken and routine 110 adds another list menu to the current file.

At 112 the routine generates hypertext source code for a list header that includes an anchor line 77, a list title line 78, and navigation commands 79. The argument for the NAME tag on anchor line 77 is derived by concatenating "F" with the current node id. The list title line 77 is generated by using the topic 62, and previous menu from the node's parent value in 64.

Next, loop 116 generates one or more list items for each node linked by sibling value in 66. If the node's mem field 67 is zero then routine 110 generates a list item 80 at 113 that has a link to an information object URL by concatenating the child field 65 with ".HTM", i.e. "A.HTM". Otherwise, the routine checks the node's file field 70. If this value corresponds to current the routine generates a list item 80 with a link to a location at the current file at 113 by concatenating "#F" with the child value in 65. Otherwise, the routine generates a list item 80 at 115 by concatenating "F" with the file field 70 with ".HTM#F" along with the child field 65, i.e. "F44.HTM#F130.

Figure 10:
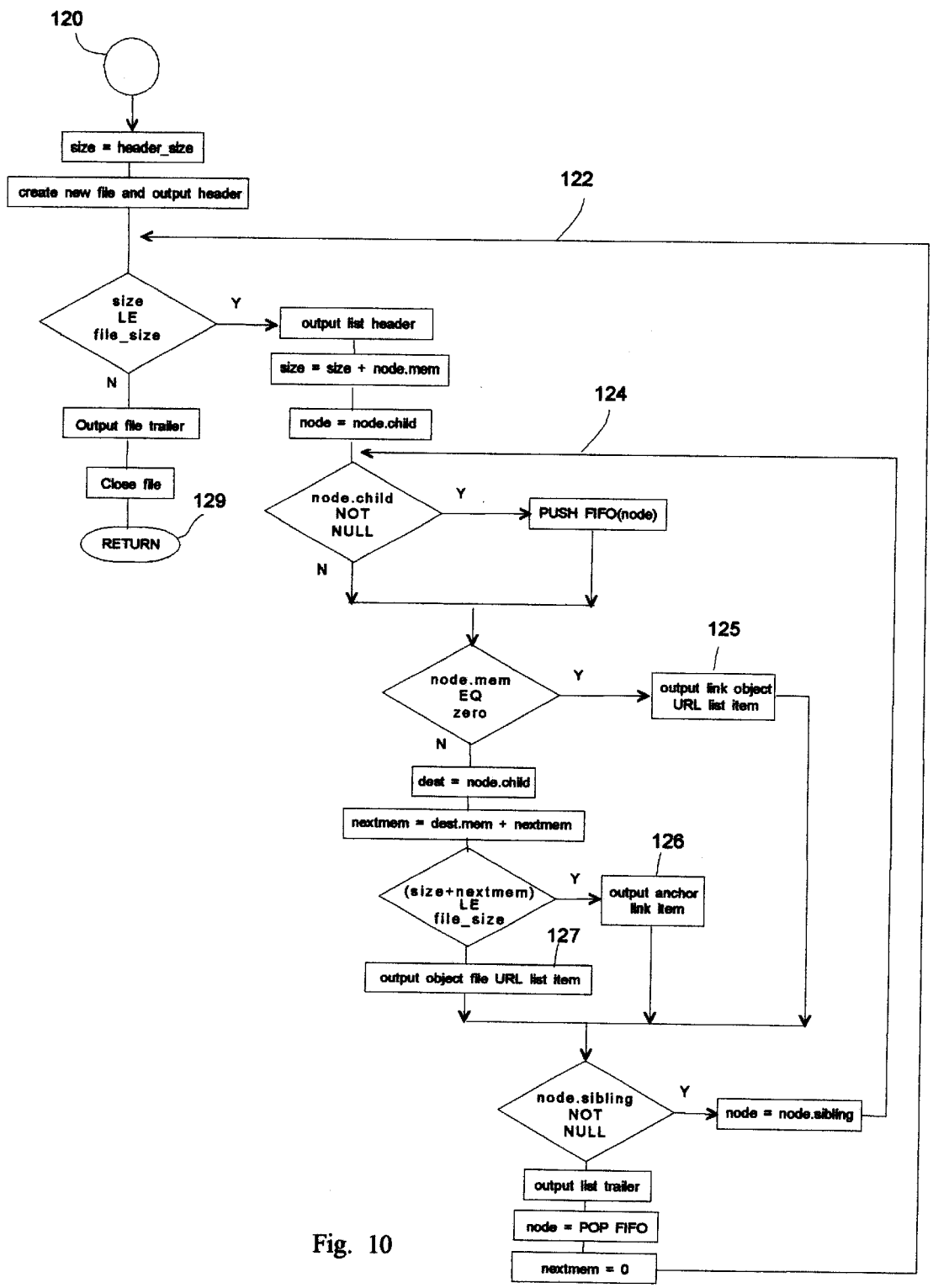
FIG. 10 depicts the flow chart of the program logic used to generate an HTML list menu file at runtime.

FIG. 10 depicts the flow chart of the program logic used to generate a hypertext list menu file on demand at runtime on a server. The calling routine, a Common Gateway Interface (CGI) script file depicted in FIG. 11, passes the node id of the selected list item. Loop 122 generates one or more list menus according to file_size set by the developer and how the developer intends to use the file. If the file is intended to track end-user navigation or the optimum file size was not set, only one list menu is generated per file.

Loop 124 is responsible for generating source code for each list item. Here subroutines 125, 126, and 127 first check if end-user tracking was set. If tracking was not set these subroutines call their respective counterparts 113, 114, or 115. Otherwise these subroutines generate a URL that refers to a CGI script on the server computer 15 that includes node 61 and time stamp parameter, HREF="http://arborway.com/cgi-bin/selected.pl?node= 24+time=150530. Alternative ways to pass node and time stamp parameters to a CGI script on a server exists, and subroutines 125, 126, and 127 can be modified to accommodate these alternatives.

Figure 11:
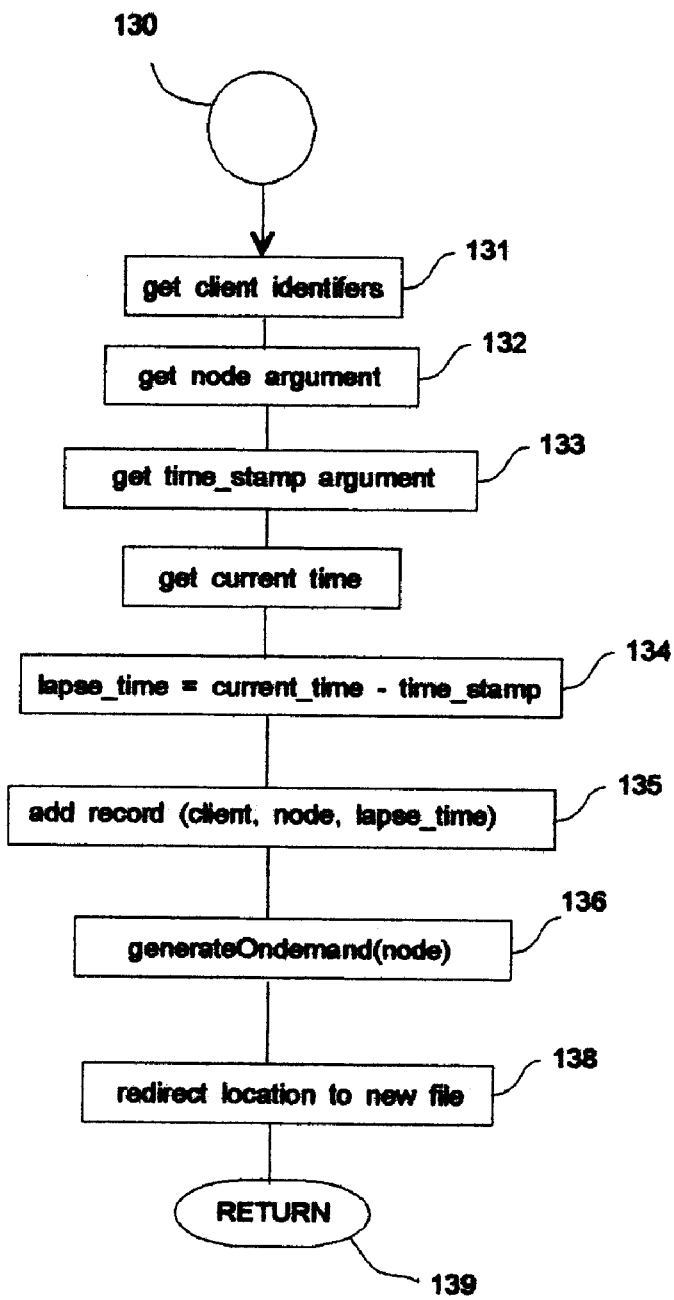
FIG. 11 depicts the flow chart of the server CGI script used to generate a runtime hypertext file that tracks end-user navigation on a content menu.

And now FIG. 11 depicts the program logic of the CGI script file on server computer 15 used to track end-user navigation. On entry, routine 130 gets client identification information at 131 from the environment variables or from arguments passed to the CGI script. Next, at 132 routine 130 gets the node and time stamp arguments. The routine calculates lapse_time at 134 by subtracting the time stamp from the current time on the server computer 15. At 135 the client identification information, selected node, and lapse time are added to a database that stores a record for each list item selected in a content menu. The set of records are used in conjunction with end-user tags in field 63 to analyze navigation paths. At 135 routine 130 calls generateOndemand routine 120 with the node 61 as parameter to generate a list menu, and then redirects the server to send new file to the client computer 12.

CONCLUSION

This concludes the description of an embodiment of the invention. The foregoing description of the embodiment of the invention has been presented for the purpose of illustration and description. It is not intended to be exhaustive or limit the invention to the precise form disclosed. Many modifications and variations are possible in light of the above teaching. The scope of the present invention is not intended to be limited by this detailed description, but rather by the claims appended hereto.

What is claimed is:

1. A menu authoring system on a computer processor consisting of, an interactive software means to build and maintain a collection of menu data using an open hierarchical data structure to organize said collection of menu data into a plurality of lists and a plurality of paths to said plurality of lists;

a software means to merge a subset of said collection of menu data with hypertext source code in order to generate a block of source code that can produce a subset of list menus in a content menu on an end-user client computer that correspond to a subset of said plurality of lists and said plurality of paths in said open hierarchical data structure;

a software means to assign hypertext links in said block of source code to locations within the same said block of source code that links a list item in one list menu to another list menu located within the same said block of source code;

a software means to generate a hypertext file that includes said block of source code that produces said subset of list menus on said end-user client computer in a client server network;

a software means to generate a plurality of said hypertext file where each said hypertext file represents a subset of paths and lists in said open hierarchical data structure;

a software means to assign links in said block of source code to locations outside said hypertext file;

a software means that enables a menu developer to control the size of said hypertext file generated by said authoring system that represents said subset of said collection of menu data organized by said open hierarchical data structure.

2. Said menu authoring system of claim 1 is implemented in at least one computer language that runs on at least one operating system on said computer processor.

3. Said open hierarchical data structure in said menu authoring system of claim 1 is stored on memory accessed by said computer in a predetermined file format recognized by at least one file storage and retrieval means on said computer processor.

4. Said block of source code in said hypertext file in claim 1 generated by said menu authoring system is implemented in at least one hypertext language recognized by a browser software system.

5. Said means to generate said hypertext file in said menu authoring system of claim 1 further includes the means to include a code that identifies a list item selected by said end-user in said list menu of said content menu on said client computer.

6. Said menu authoring system of claim 1 further includes the means to enable said menu developer to compile a complete set of said hypertext file known as a distribution release that represents all possible lists and paths in said open hierarchical data structure.

7. Said menu authoring system of claim 1 further includes a script file on a server computer that is implemented in at least one scripting language that communicates with a browser software on said client computer in said client server network.

8. Said script file of claim 7 of said menu authoring system further includes the software means to receive from said browser software said code used to identify said list item selected by said end-user in said list menu of said content menu on said client computer in said client server network.

9. Said script file of claim 7 of said menu authoring system further includes the software means to generate said hypertext file at runtime from said collection of menu data organized by said open hierarchical data structure.

10. Said script file of claim 7 of said menu authoring system further includes the software means to generate a time stamp and include said time stamp value in said hypertext file generated at runtime.

11. A menu authoring system on a computer processor consisting of, building and maintaining a collection of menu data using an open hierarchical data structure to organize said collection of menu data into a plurality of lists and a plurality of paths to said plurality of lists;

merging a subset of said collection of menu data with hypertext source code in order to generate a block of source code that can produce a subset of list menus in a content menu on an end-user client computer that correspond to a subset of said plurality of lists and said plurality of paths in said open hierarchical data structure;

assigning hypertext links in said block of source code to locations within the same said block of source code that links a list item in one list menu to another list menu located within the same said block of source code;

generating a hypertext file that includes said block of source code that produces said subset of list menus on said end-user client computer in a client server network;

generating a plurality of said hypertext file where each said hypertext file represents a subset of paths and lists in said open hierarchical data structure;

assigning links in said block of source code to locations outside said hypertext file;

controlling the size of said hypertext file generated by said authoring system that represents said subset of said collection of menu data organized by said open hierarchical data structure.

12. Said menu authoring system of claim 11 is implemented in at least one computer language that runs on at least one operating system on said computer processor.

13. Said open hierarchical data structure of menu authoring system of claim 11 is stored on memory accessed by said computer in a predetermined file format recognized by at least one file storage and retrieval means on said computer processor.

14. Said block of source code in said hypertext generated by said menu authoring system of claim 11 is implemented in at least one hypertext language recognized by a browser software system.

15. Said hypertext file generated by said menu authoring system of claim 11 further includes a code that identifies a list item selected by said end-user in said content menu on said client computer.

16. Said menu authoring system of claim 11 further includes compiling a complete set of said hypertext file known as a distribution release that represents all possible lists and paths in said open hierarchical data structure.

17. Said menu authoring system of claim 11 further includes executing a script file on a server computer in said client-server network that is implemented in at least one scripting language and that communicates with said browser software system on said client computer in said client server network.

18. Said script file of claim 17 on said server computer in said client-server network further includes receiving from said browser software system said code used to identify said list item selected made by said end-user in said list menu of said content menu on said client computer.

19. Said script file of claim 17 on said server computer in said client-server network further includes generating said hypertext file at runtime from said collection of menu data managed by said open hierarchical data structure.

20. Said script file of claim 17 on said server computer in said client-server network further includes adding a time stamp field to said hypertext file generated at runtime.

* * * * *